United States Patent [19]
Holmes

[11] Patent Number: 5,358,142
[45] Date of Patent: Oct. 25, 1994

[54] MOUTH-PRESSURIZED DRINKING BAG

[76] Inventor: William A. Holmes, 209 Highland Ave., Piedmont, Calif. 94611-3709

[21] Appl. No.: 34,075

[22] Filed: Mar. 22, 1993

[51] Int. Cl.$^5$ .................. B65D 35/00; B62J 11/00
[52] U.S. Cl. .......................................... 222/1; 222/95; 222/105; 222/610; 222/183; 222/400.7; 222/212; 224/35; 224/32 R
[58] Field of Search ............... 280/288.4; 224/30 R, 224/32 R, 35, 148; 222/175, 610, 400.7, 401, 95, 212, 105, 386.5, 209, 183, 130, 215, 1; 239/327, 323

[56] References Cited

U.S. PATENT DOCUMENTS

| | | | |
|---|---|---|---|
| 4,095,812 | 6/1978 | Rowe | 280/289 R |
| 4,505,310 | 3/1985 | Schneider | 222/175 X |
| 4,629,098 | 12/1986 | Eger | 222/175 |
| 4,815,635 | 3/1989 | Porter | 280/288.4 X |
| 4,911,339 | 3/1990 | Coshing | 222/610 |
| 4,948,023 | 8/1990 | Tripp | 224/148 |
| 4,964,540 | 10/1990 | Katz | 222/386.5 X |
| 5,059,182 | 10/1991 | Laing | 222/95 X |
| 5,060,833 | 10/1991 | Edison et al. | 224/148 |
| 5,062,591 | 11/1991 | Runkel | 224/148 |
| 5,127,554 | 7/1992 | Loychuk | 222/386.5 X |
| 5,143,260 | 9/1992 | Loychuk | 222/386.5 X |
| 5,158,218 | 10/1992 | Wery | 222/610 |
| 5,210,442 | 4/1993 | Bakalian | 222/610 |
| 5,215,231 | 6/1993 | Paczonay | 222/610 |
| 5,230,566 | 7/1993 | Jackson et al. | 224/148 X |

Primary Examiner—Andres Kashnikow
Assistant Examiner—Anthoula Pomrening
Attorney, Agent, or Firm—David Pressman

[57] ABSTRACT

A mouth-pressurized drinking bag comprises a collapsible inner bladder for holding a beverage, such as water. A long tube has a proximal end communicably attached to the lowest portion of the bladder, and a distal end extending away from the dispenser. A closure clamp is disposed near the distal end of the tube. A highly elastic outer case substantially and snugly surrounds the bladder. The bladder can be filled through a funnel temporarily disposed at the distal end of the tube. The filled bladder can be pressurized by blowing air through the tube, so that the bladder and the elastic outer case are expanded. After the bag is filled and pressurized, the clamp is closed. When a drink is desired, the clamp is released so that the beverage will be automatically forced by the pressurized inner bladder to flow outwardly through the tube and to the user's lips.

21 Claims, 4 Drawing Sheets

MOUTH-PRESSURIZED DRINKING BAG

FIELD OF THE INVENTION

This invention relates generally to liquid dispensers, specifically to a mouth-pressurized drinking bag for cyclists.

BACKGROUND OF THE INVENTION

Cyclists riding for sport or training for competition expend a great deal of energy, and lose a great deal of water as sweat. As a result, they need to drink a lot of water when cycling to quench their thirst. The most common method of providing drinking water, for non-competition cycling, is to carry a detachable water bottle on the frame of the bicycle. However, using this type of bottle when the bicycle is in motion can be dangerous, because the cyclist must look away from the road when taking the bottle from and replacing it into its cradle. Therefore, many cyclists prefer to come to a stop before drinking, which can be quite inconvenient. The water from these non-insulated bottles is usually warm, so that it does not make a refreshing drink.

The drawbacks of the ubiquitous water bottle have prompted the invention of several devices for allowing cyclists to drink while riding. U.S. Pat. Nos. 4,095,812 to Rowe (1978) and 4,948,023 to Tripp (1990) show conventional water containers with very long straws. These straws allow a cyclist to sip a beverage without stopping. A significant problem of these systems is the difficulty of sucking liquid through a long straw. This is because the user must first suck out the great amount of air in the straw, and then work against the weight of the tall column of water to bring the water up through the straw. The process must be repeated for every use because the water will drop back down the straw after each sip. This can become very difficult to perform during a strenuous activity, such as cycling.

U.S. Pat. No. 5,060,833 to Edison et al. (1991) shows a water backpack with a bite-valve at the distal end of a tube. The user bites on the valve to accept water, which is caused by gravity to flow from the backpack into the tube. Although easy to use, this device will only work if it is located above the mouth, because it relies on gravity for feeding the water through the tube. Therefore, it can only be used by cyclists on bicycles with drooped handlebars, as shown in the patent. Moreover, many cyclists dislike wearing a large, constricting backpack.

U.S. Pat. No. 4,629,098 to Eger (1986) shows a rigid, pump-pressurized liquid container. A tube extending from the container has two separate passages, and a rubber bulb pump at the distal end. Pumping the bulb pressurizes the container via one passage, so that when a valve is released, liquid is forced out of the other passage of the tube. The valve has a knob which must be operated with two hands, so that it will require a cyclist to stop riding before drinking. It is fairly complicated in construction, so that its manufacturing cost will be relatively high.

U.S. Pat. No. 5,062,591 to Runkel (1991) shows a water container comprising a small, heavy latex or rubber balloon with a long feed tube connected to the top of the balloon. When filled and greatly expanded, the balloon will contract to force water through the tube and conveniently to the user. Although drinking from this device is very easy, filling it is more difficult. A pump, which can be inconvenient to carry, must be used to force water under higher than atmospheric pressure into the small balloon. Because the balloon has a minimum volume below which it cannot contract, and because the tube is connected to the top of the balloon, the user will not be able to drink the last amount of beverage. The small balloon must have enough elasticity for expansion, therefore it can only be made of latex or rubber. These materials are rather heavy, and have poor thermal insulating qualities. Furthermore, they impart an unpleasant rubbery taste to the drink. The elastic balloon is placed within an enlarged, non-elastic holder or outer case. The outer case is large enough to accommodate the balloon when it is fully filled and expanded. However, when the balloon is nearly empty, the non-elastic outer case will be loose, so that when the bicycle is in motion, the loose outer case will flap about to create considerable wind drag.

While the foregoing drinking devices for cyclists do in fact provide the benefit of drinking without having to stop riding, they have many shortcomings, including the difficulty of sucking through long straws, the requirement of carrying the container above mouth level, poor thermal insulating qualities, the inconvenience of having to pressure-fill the container with a pump, the rubbery taste imparted to the water by the containers, and the inability to access a remaining quantity of a beverage in the container.

OBJECTS AND ADVANTAGES

In accordance with the present invention, I provide a mouth-pressurized drinking bag for cyclists which:

A. Automatically feeds water to the user through a tube, without requiring any suction, although suction can sometimes be used if desired.

B. Allows cyclists to drink without having to stop riding.

C. Can be operated with one hand, or even hands-free when suitably configured, without diverting a cyclist's attention from the road.

D. Can be easily filled by gravity, without special tools.

E. Can be mounted on the frame of a bicycle, and below mouth level.

F. Easily mouth-pressurized.

G. Contents can be substantially emptied, so that almost no beverage will remain unused.

H. Insulated to keep the beverage hot or cold.

I. Has a non-rubber beverage container, so that the beverage has no unpleasant rubber taste.

J. Collapsible, durable, and lightweight.

K. Streamlined for low drag, without loose fabric to flap in the wind to create drag.

L. Allows the user to easily set or adjust the beverage pressure and delivery rate.

M. Can be simply and economically manufactured in a variety of shapes and capacities, and can accommodate many types of inner collapsible containers.

N. Ice can be placed in the drinking bag to chill the beverage, without clogging the drinking tube.

O. A second beverage container can be used for conveniently refilling the drinking bag.

Further objects and advantages will become apparent from a study of the following description and the accompanying drawings.

SUMMARY OF THE INVENTION

In a preferred embodiment of the invention, a mouth-pressurized drinking bag comprises a sloped, collapsible bladder having a long tube extending outwardly from its lowest portion. A closure clamp placed along the tube provides an air tight seal. A highly elastic outer case snugly surrounds the bladder, so that when the bladder is empty, the elastic case compresses the bladder to a very small volume. Because the elastic case snugly surrounds the bladder, the drinking bag is very aerodynamic, with no loose fabric to flap in the wind to cause drag.

The bladder can be filled through a funnel placed at the distal end of the tube. The weight of the water will cause both the bladder and the outer case to expand. The filled bag can be strapped onto the frame or the cargo rack of a bicycle. The user pressurizes the bag by blowing into the tube, then sealing it with the clamp. When the clamp is released, the elastic outer case will contract to automatically force water up through the hose and to the user's lips, so that the user can drink with great ease.

Figure 1A:
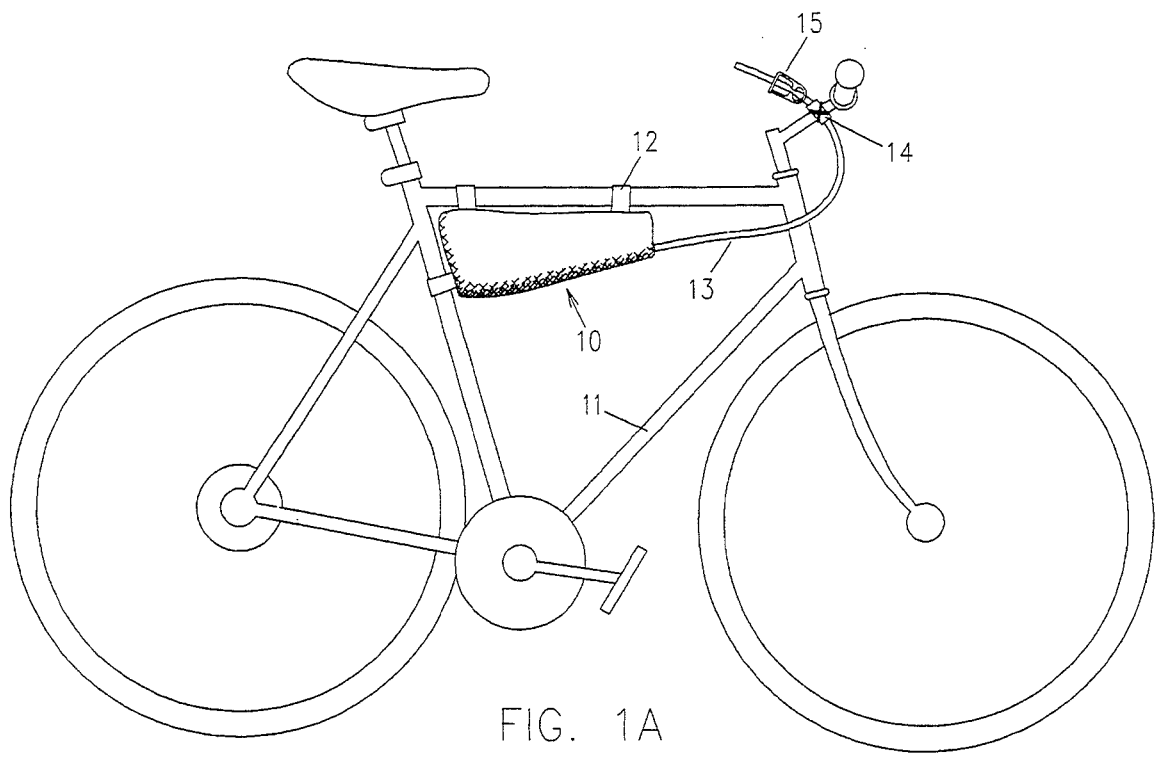
FIG. 1A is a side view of a mouth-pressurized drinking bag, mounted on the frame of a bicycle, in accordance with a preferred embodiment of the invention.

Description - FIG. 1A

In accordance with a preferred embodiment of the invention shown in FIG. 1A, a mouth-pressurized drinking bag 10 is generally elongated horizontally. The left side of the drinking bag is taller than the right so that the bottom side slopes downwardly towards the left. Drinking bag 10 is mounted on the frame of a bicycle 11 by three hook-and-loop straps 12. The bag has a long tube 13 extending from the right side. The distal end of tube 13 is slidably fastened to the handlebar of the bicycle by a bracket 14, which is attached to the handlebar with tape or nylon straps. A conventional tubing closure clamp 15 is disposed near the distal end of tube 13 to serve as a valve. The clamp is shown in the closed position, so that tube 13 is pinched closed for an airtight seal.

Figure 1B:
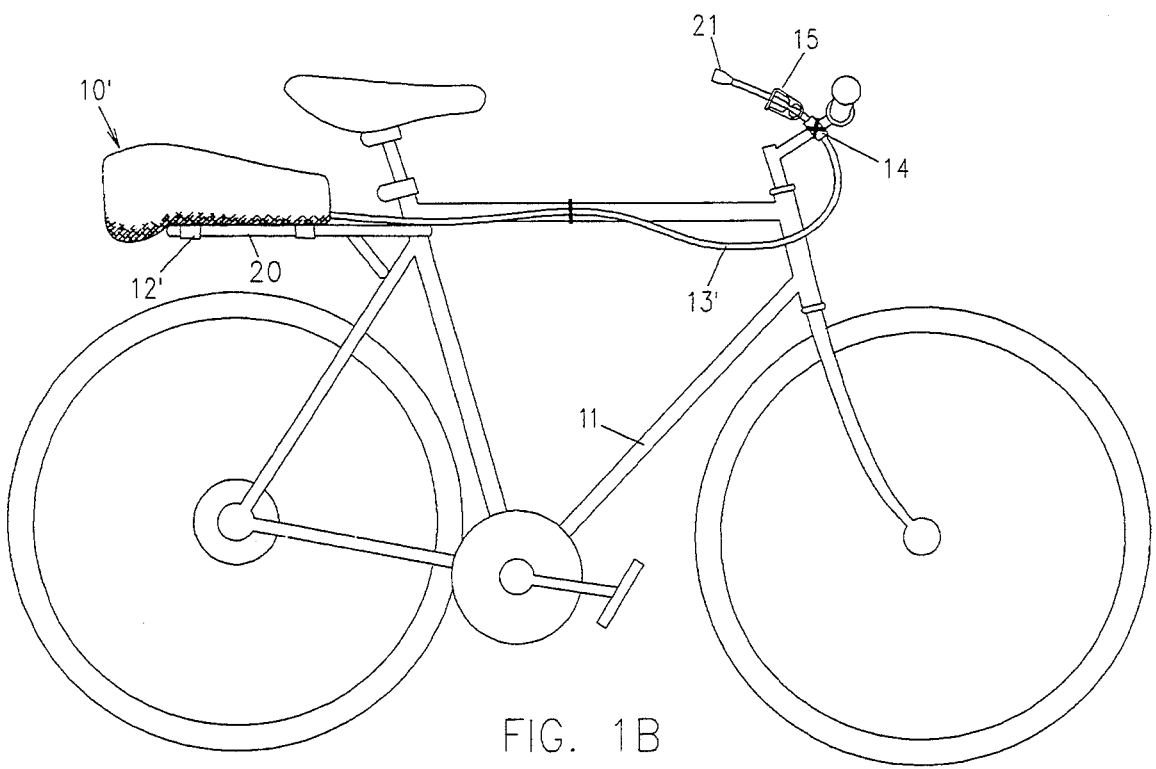
FIG. 1B is a side view of a second embodiment of the drinking bag of FIG. 1A, alternatively mounted on the cargo rack of a bicycle.

Description - FIG. 1B

Drinking bag 10', a second embodiment of drinking bag 10 (FIG. 1A), is shown mounted on a cargo rack 20 of a bicycle 11. Hook-and-loop straps 12' extending from the bottom of the bag secure it on the rack. Cargo rack 20, sold under the trademark "OutRack," is a snap-on accessory suitable for mounting on most bicycles, and is available from Spectrum Sports Services of San Diego, Calif.. The left portion of bag 10' extends beyond the end of cargo rack 20, such that the lower left corner of the bag droops slightly below the rest of the bag. The purpose of this will be explained later in connection with FIG. 3B. A conventional, rubberized bite-valve 21 is disposed at the distal end of an extra long tube 13'.

After drinking bag 10' is filled with a beverage (the procedure will be explained in connection with FIG. 3A), clamp 15 will be left in an open position. Normally-closed bite-valve 21 will open when bitten, so that it will allow the rider to drink without using the hands. This greatly improves safety and convenience, because the rider can drink while riding and maintaining attention on the road.

Figure 2:
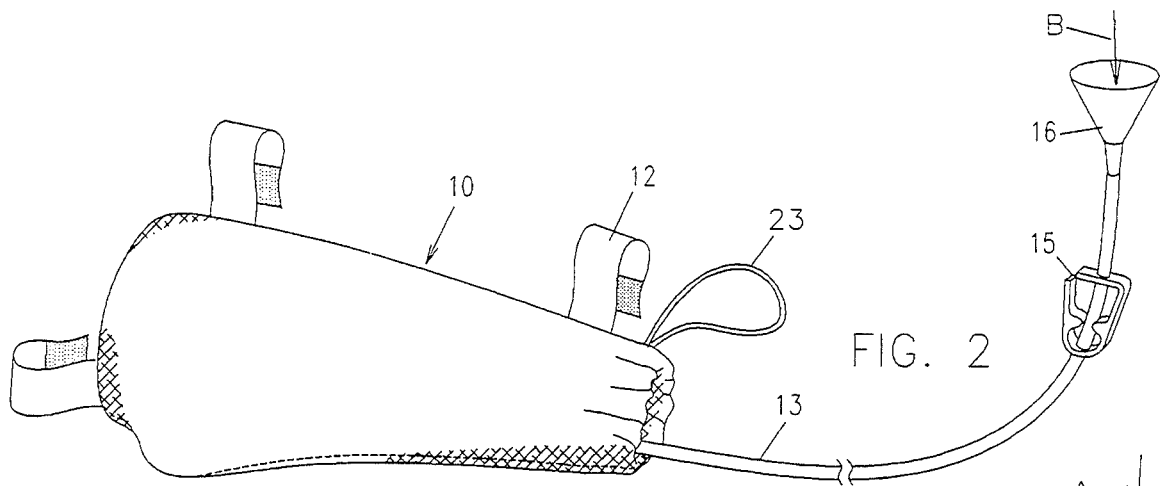
FIG. 2 is a perspective view of the mouth-pressurized drinking bag of FIG. 1A.

Description - FIG. 2

A perspective view of drinking bag 10 is shown. The bag has a closed left end, and an open right end, tightened by a drawcord 23. Tube 13 extends outwardly from the right end of the bag.

Drinking bag 10 can be easily filled by first releasing clamp 15 to have the air inside substantially sucked out by mouth through tube 13. Clamp 15 is then closed to maintain the partial vacuum inside the bag. A beverage B, such as chilled water, is poured into a small funnel 16 which is temporarily placed at the distal end of tube 13. Clamp 15 is opened, as shown, to allow beverage B to flow through tube 13 into bag 10, which will expand substantially. Beverage B is continued to be added until bag 10 cannot hold any more. Clamp 15 is then closed to maintain a watertight seal. When not in use, funnel 16 can be stored inside the right end of bag 10. Drinking bag 10 can be filled easily in this manner, whether it is mounted on or detached from a bicycle.

Figure 3A:
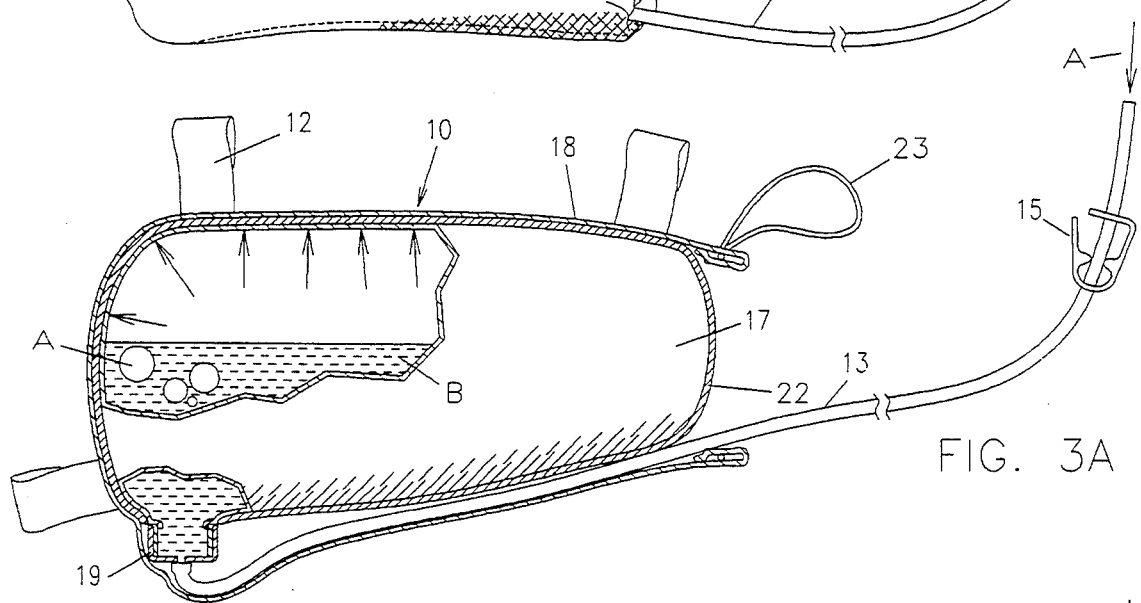
FIGS. 3A and 3B are side partial sectional views of the mouth-pressurized drinking bag of FIG. 2.
Figure 3B:
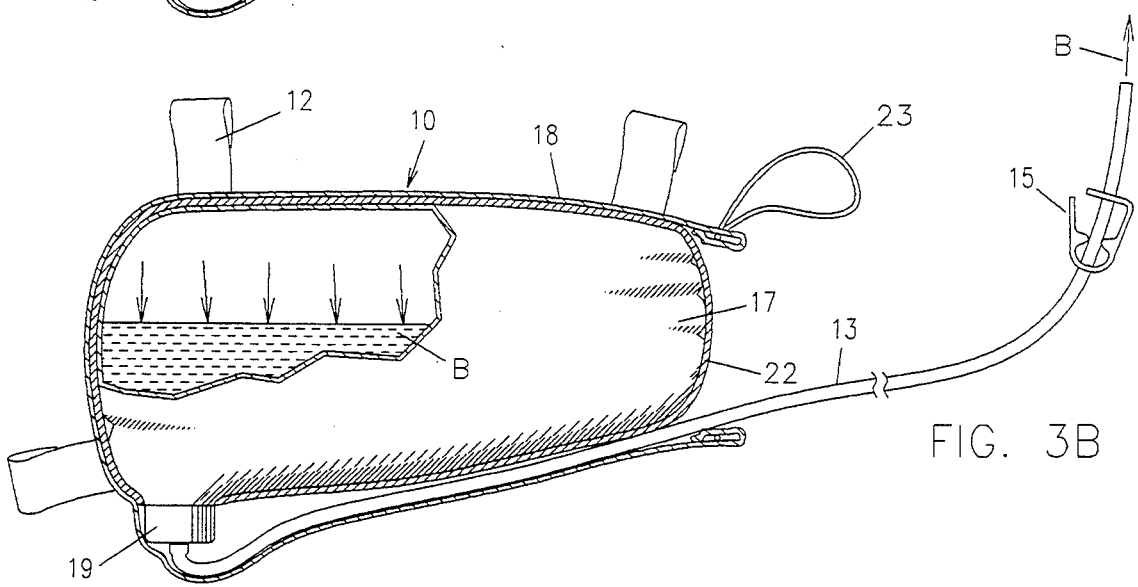

Description - FIGS. 3A and 3B

Side partial sectional views of drinking bag 10 are shown. Referring to FIG. 3A, the bag comprises a collapsible, inner beverage bladder 17 made of vinyl, or any other suitable, watertight, thermoplastic material. Other types of collapsible liquid containers can be used. A layer of insulation 22, such as that sold under the trademark "Thermolite" by DuPont, surrounds the bladder, although other suitable materials can be used. The insulation helps to maintain the desired temperature of the beverage, whether hot or cold. An elastic outer case 18 of a highly flexible material, such as that sold under the trademark Lycra Spandex by DuPont, substantially and snugly surrounds beverage bladder 17. Tube 13 is routed under bladder 17, between the bladder and outer case 18, and communicates with the bladder through a removable connector 19 disposed at the lower left corner of the bladder.

After drinking bag 10 is filled with beverage B as described in FIG. 2, the user opens clamp 15 and blows air A into bladder 17 through tube 13 to pressurize it, as shown in FIG. 3A by the arrows inside the bladder. As bladder 17 is mouth-pressurized, it and elastic outer case 18 are considerably expanded. When the bladder is substantially full, clamp 15 is closed, as shown in FIG. 1A, to maintain the pressure. Bladder 17 can be partially filled with beverage B and frozen before it is filled to capacity with the liquid beverage. The frozen beverage will slowly melt to chill the liquid beverage to provide cool, refreshing drinks. Alternatively, ice (not shown) can be inserted into bladder 17 after elastic outer case 18 and connector 19 are removed. After partially filling the bladder with ice, the connector and the outer case are replaced, so that the drinking bag can be filled with beverage B in the normal manner, as described in FIG. 2.

When a drink is desired, clamp 15, which can be easily operated with one hand, is released as shown in FIG. 3B. The air pressure against beverage B inside bladder 17, as shown by the arrows, will automatically force the beverage outwardly through tube 13 to conveniently bring the drink to the distal end of the tube and the user's lips. The beverage will continue to flow outwardly as long as elastic outer case 18 continues to contract to maintain enough pressure inside bladder 17. A variety of tube sizes can be used for tube 13. Larger tubes will allow greater flow rates, while smaller tubes will allow a trickle and save weight, which can be important for distance riders. The rider can also easily change the flow rate by varying the pressure inside the bladder. If optional bite-valve 21 (FIG. 1B) is used, the user can initiate beverage flow simply by biting on the valve, so that a drink can be safely and conveniently obtained without using the hands. Because the distal end of tube 13 is located above the handlebars of bicycle 11 (FIGS. 1A and 1B), it will be positioned near the mouth of a cyclist, who can safely drink without stopping or looking away from the road.

As beverage B is consumed, elastic outer case 18 will contract to collapse bladder 17, as shown in FIG. 3B. When the pressure has dropped so far that the beverage flow slows to a trickle or has just stopped, tube 13 will still be filled with the beverage. Therefore, the user or cyclist can continue to drink by lightly sucking on tube 13. The elastic outer case will remain snug around the collapsible bladder even when the bladder is empty, so that the drinking bag will remain streamlined.

Drinking bag 10 can be easily repressurized by moderately blowing into tube 13. In this manner, bladder 17 can be substantially emptied in several pressurizing and drinking cycles. Because the proximal end of tube 13 is attached to the lowest point of bladder 17, beverage B will collect at the tube, so that the last tablespoon of the beverage can easily be consumed. Furthermore, when ice is placed in bladder 17, it will float away from connector 19, so that the proximal end of tube 13 is not blocked.

Referring back to FIG. 1B, drinking bag 10' is installed such that beverage B (not shown) will collect at the drooped portion of the bag extending beyond the left end of cargo rack 20, so that the bag can be substantially emptied of its contents.

Figure 4A:
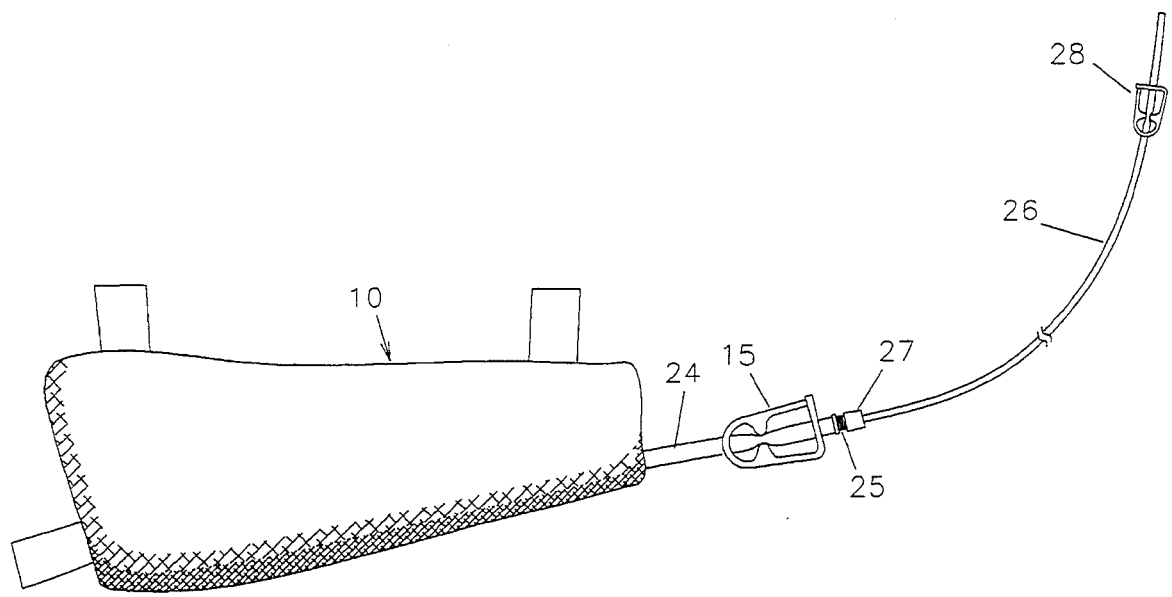
FIG. 4A is a side view of a third embodiment of the drinking bag.
Figure 4B:
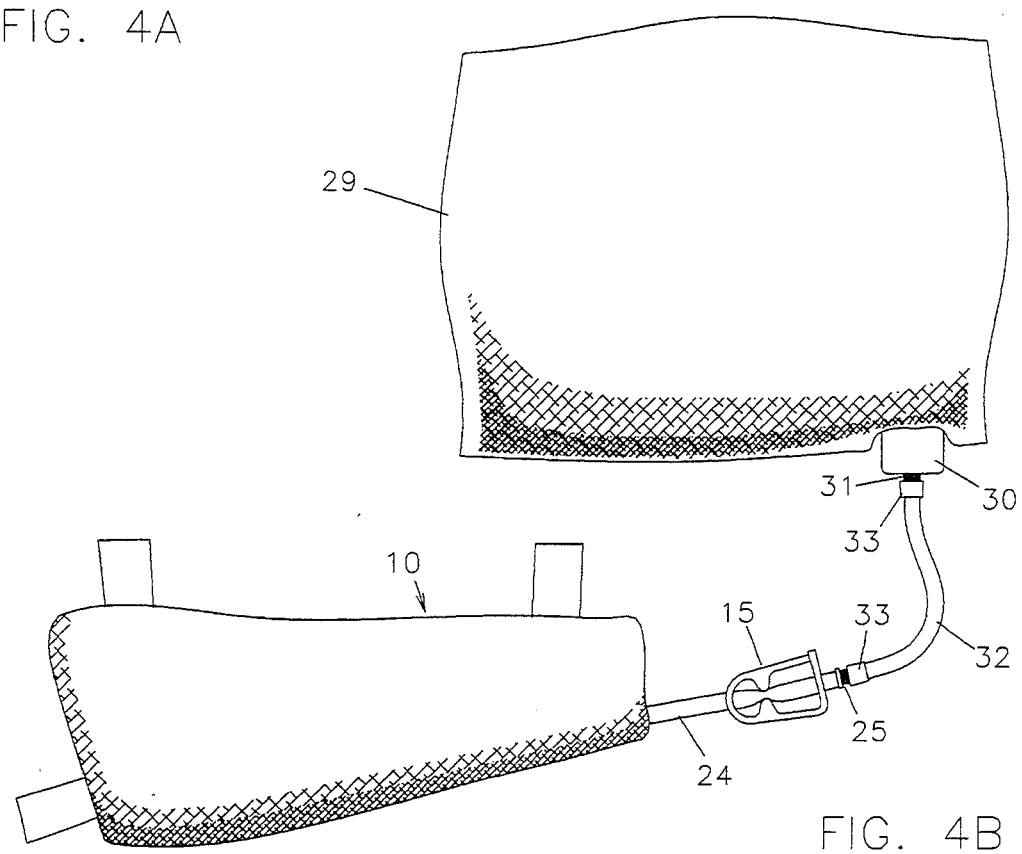
FIG. 4B is a side view of the drinking bag of FIG. 4A being filled from another beverage container.

Description - FIGS. 4A and 4B

A third embodiment of drinking bag 10 is shown in FIG. 4A. A short tube 24, which has the same diameter as tube 13 (FIGS. 1A to 3B), extends out the open right end of bag 10. Short tube 24 has a conventional, threaded male connector 25 disposed on its distal end. A thin drinking tube 26 has a conventional, threaded female connector 27 disposed on its proximal end for connecting to male connector 25 on short tube 24. Clamp 15 is disposed on short tube 24, and a small clamp 28 is disposed near the distal end of thin tube 26.

Clamp 15 is normally left in an open position. Thin tube 26 and small clamp 28, which are very lightweight and easy to handle, are used for drinking and pressurizing bag 10, and controlling the beverage flow, respectively, in a manner similar to that described in FIGS. 3A and 3B.

Drinking bag 10 is shown being refilled from an auxiliary, collapsible beverage container 29 in FIG. 4B. The auxiliary container has a conventional screw-on cap 30, similar to connector 19 (FIGS. 3A and 3B), with a male connector 31 extending therefrom. Auxiliary container 29 can be easily filled by removing cap 30 and pouring in a beverage (not shown). It can be carried, either empty or pre-filled, in a cyclist's backpack or strapped onto the cargo rack of a bicycle. It can be easily taken to a source of water, such as a stream or a faucet, for refilling.

Referring back to FIG. 4A, when drinking bag 10 is to be refilled, it is first substantially emptied of its air by sucking through thin tube 26. Clamp 15 is closed to maintain the partial vacuum inside. Thin tube 26 is then removed by unscrewing female connector 27 from short tube 24.

As shown in FIG. 4B, an adapter tube 32, which has female connectors 33 at both ends, is connected between male connector 25 of short tube 24 and male connector 31 of cap 30. Clamp 15 is opened to begin the transfer of the beverage (not shown) from auxiliary bag 29 into drinking bag 10. The auxiliary bag is positioned above the drinking bag, so that the flow will be initiated and sustained by gravity, although the auxiliary bag can be squeezed to speed the transfer. When the transfer is complete, clamp 15 is closed so that adapter tube 32 can be removed and thin tube 26 reattached. Clamp 15 is opened so that the drinking bag can be pressurized and used normally.

Figure 5:
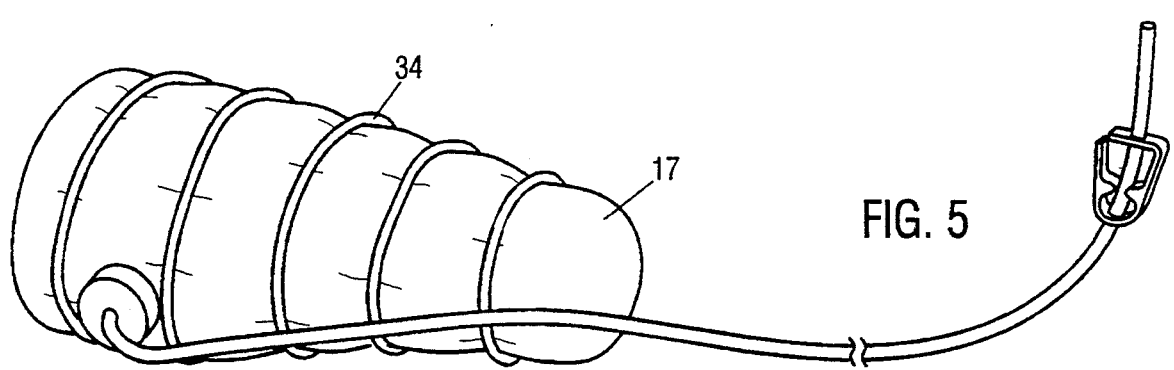
FIG. 5 is a perspective view of a fourth embodiment of the drinking bag.

Description - FIG. 5

In accordance with a fourth embodiment of the invention shown in FIG. 5, beverage bladder 17 is snugly surrounded by an elastic cord 34 instead of elastic outer case 18 (FIGS. 3A and 3B).

Ramifications And Scope

While the above descriptions are specific, they should not be considered as limitations on the scope of the invention, but only as examples of the embodiments. Many other ramifications and variations are possible within the teachings of the invention. For example, instead of hook-and-loop straps 12, other types of fasteners can be used to attach drinking bag 10 to a bicycle frame or to a cargo rack attached to a bicycle frame. The drinking bag can be made in a variety of other shapes. Elastic outer case 18 can be replaced with an elongated elastic cord, which can be snugly wound around bladder 17. Instead of being mouth pressurized, the drinking bag can be pressurized by a small pump. The drinking bag can be used in a variety of other applications, such as under wheelchairs, car seats, airplane seats, or in many other situations where the user is restricted to a single location for prolonged periods of time. In all applications, the mounting of the drinking bag is very flexible: It can be placed virtually anywhere, and can even be sealed in a wall or console if desired. Only clamp 15 and the distal end of tube 13 need to remain accessible. Therefore, the reader is requested to determine the scope of the invention by the appended claims and their legal equivalents, and not by the examples given.

I claim:

1. A beverage dispenser, comprising:
   a collapsible bladder for receiving a beverage and pressurizing air, said bladder having a top and a bottom,
   means for mounting said bladder so that said top thereof is uppermost and said bottom thereof is lowermost, elastic means snugly and substantially surrounding said bladder, such that when said bladder is empty of said beverage and said pressurizing air, said elastic means substantially collapses said bladder, and when said bladder is partially or completely filled with said beverage and said pressurizing air, said elastic means continually exerts a force upon said bladder which urges and tends to compress said bladder to a collapsed condition so as to tend to expel said beverage from said bladder, said elastic means being expanded by a user blowing said pressurizing air into said bladder, an elongated tube attached to said bottom of said bladder, said tube having a proximal end communicating with said bladder, said tube having a distal end extending away from said bladder, such that when said bladder is partially filled with said beverage, said pressurizing air is blown by mouth into said bladder through said tube to pressurize and thereupon also expand said bladder and expand said elastic means, whereby, when dispensing is desired, said force continually provided by said elastic means will compress said bladder and force said beverage to automatically flow outwardly through said distal end of said tube.

2. The beverage dispenser of claim 1 wherein said elastic means comprises an elastic outer case made of a sheet material.

3. The beverage dispenser of claim 1 wherein said elastic means comprises an elongated elastic cord wound around said bladder.

4. The beverage dispenser of claim 12 wherein said bladder is made of a non-rubber material.

5. The beverage dispenser of claim 1 wherein said bladder is made of a plastic material.

6. The beverage dispenser of claim 1, further including a closure clamp disposed on said tube.

7. The beverage dispenser of claim 1, further including a bite-valve disposed on said tube.

8. A mouth-pressurized beverage dispenser, comprising:

a collapsible bladder for receiving a beverage and pressurizing air, said bladder having a top and a bottom, means for mounting said bladder so that said top thereof is uppermost and said bottom thereof is lowermost, an elastic outer case made of a sheet material, said elastic outer case snugly and substantially surrounding said bladder, such that when said bladder is empty of said beverage and said pressurizing air, said elastic outer case substantially collapses said bladder, and when said bladder is partially or completely filled with said beverage and said pressurizing air, said elastic outer case continually exerts a force upon said bladder which urges and tends to compress said bladder to a collapsed condition so as to tend to expel said beverage from said bladder said elastic outer case being expanded by a user blowing said pressurizing air into said bladder, an elongated tube attached to said bottom of said bladder, said tube having a proximal end communicating with said bladder, such that when said bladder is partially filled with said beverage, said beverage will automatically collect at said bottom of said bladder and said proximal end of said tube, said tube having a distal end extending away from said bladder, and valve means disposed on said tube, said valve means being openable and closeable, such that (a) when said valve means is open, and when said bladder is partially filled with said beverage, said pressurizing air is blown by mouth into said bladder through said tube to pressurize and expand said bladder and thereupon also expand said elastic outer case, whereupon said valve means can be closed after said bladder is pressurized, and (b) when dispensing is desired, said valve means can be opened again such that said force continually provided by said elastic outer case will compress said bladder and force said beverage to automatically flow outwardly through said distal end of said tube;

9. The beverage dispenser of claim 8 wherein said bladder is made of a non-rubber material.

10. The beverage dispenser of claim 8 wherein said bladder is made of a plastic material.

11. The beverage dispenser of claim 8 wherein said bottom of said bladder is sloped, and said proximal end of said tube is communicably attached to a lowest point of said sloped bottom of said bladder.

12. The beverage dispenser of claim 8 wherein said valve means comprises a closure clamp.

13. The beverage dispenser of claim 8, further including a bite-valve disposed on said tube.

14. The beverage dispenser of claim 8, wherein said means for mounting comprises a plurality of hook-and-loop straps for strapping said beverage dispenser to a bicycle.

15. A mouth-pressurized beverage dispenser, comprising:

a collapsible bladder for receiving a beverage and pressurizing air, said bladder having a top and a bottom, means for mounting said bladder so that said top thereof is uppermost and said bottom thereof is lowermost, an elongated elastic cord snugly and substantially surrounding said bladder, such that when said bladder is empty of said beverage and said pressurizing air, said elastic cord substantially collapses said bladder, and when said bladder is partially or completely filled with said beverage and said pressurizing air, said elastic cord continually exerts a force upon said bladder which urges and compresses said bladder to a collapsed condition so as to tend to expel said beverage from said bladder, said elastic cord being expanded by a user blowing said pressurizing air into said bladder, an elongated tube attached to said bottom of said bladder, said tube having a proximal end communicating with said bladder, such that when said bladder is partially filled with said beverage, said beverage will automatically collect at said bottom of said bladder and said proximal end of said tube, said tube having a distal end extending away from said bladder, and valve means disposed on said tube, said valve means being openable and closeable, such that (a) when said valve means is open, and when said bladder is partially filled with said beverage, said pressurizing air is blown by mouth into said bladder through said tube to pressurize and expand said bladder and thereupon also expand said elastic cord, whereupon said valve means can be closed after said bladder is pressurized, and (b) when dispensing is desired, said valve means can be opened again such that said force continually provided by said elastic cord will compress said bladder and force said beverage to automatically flow outwardly through said distal end of said tube.

16. The beverage dispenser of claim 15 wherein said bottom of said bladder is sloped, and said proximal end of said tube is communicably attached to a lowest point of said sloped bottom of said bladder.

17. The beverage dispenser of claim 15 wherein said valve means comprises a closure clamp.

18. The beverage dispenser of claim 15, further including a bite-valve disposed on said tube.

19. The beverage dispenser of claim 15 wherein said bladder is made of a non-rubber material.

20. The beverage dispenser of claim 15 wherein said bladder is made of a plastic material.

21. A method of supplying a beverage to a user, comprising:

providing a collapsible bladder for receiving a beverage and pressurizing air, said bladder having a top and a bottom, mounting said bladder so that said top thereof is uppermost and said bottom thereof is lowermost, providing elastic means snugly and substantially surrounding said bladder, such that when said bladder is empty of said beverage and said pressurizing air, said elastic means substantially collapses said bladder, and when said bladder is partially or completely filled with said beverage and said pressurizing air, said elastic means continually exerts a force upon said bladder which urges and tends to compress said bladder to a collapsed condition so as to tend to expel said beverage from said bladder, said elastic means being expanded by said user blowing said pressurizing air into said bladder, providing an elongated tube attached to said bottom of said bladder, said tube having a proximal end communicating with said bladder, said tube having a distal end extending away from said bladder, adding a quantity of said beverage into said bladder, pressurizing said bladder by blowing pressurizing air from the mouth of said user into said bladder via said tube to pressurize said bladder, and consuming said beverage by allowing the force exerted by the elastic means upon said bladder to expel said beverage out of said bladder and said tube into said user's mouth, whereby said beverage can be stored and conveniently consumed by said user without external pressurizing or pumping devices other than the user's mouth.

* * * * *